(12) United States Patent
Lundgren

(10) Patent No.: US 8,347,812 B2
(45) Date of Patent: Jan. 8, 2013

(54) DEVICE AND METHOD FOR CLEANING CABLES

(76) Inventor: Tage Lundgren, Hunnebostrand (SE)

(*) Notice: Subject to any disclaimer, the term of this patent is extended or adjusted under 35 U.S.C. 154(b) by 1069 days.

(21) Appl. No.: 12/294,930

(22) PCT Filed: Apr. 2, 2007

(86) PCT No.: PCT/SE2007/050208
§ 371 (c)(1),
(2), (4) Date: Oct. 2, 2008

(87) PCT Pub. No.: WO2007/114785
PCT Pub. Date: Oct. 11, 2007

(65) Prior Publication Data
US 2010/0173081 A1    Jul. 8, 2010

(30) Foreign Application Priority Data
Apr. 5, 2006 (SE) .................................... 0600777

(51) Int. Cl.
| B05C 11/00 | (2006.01) |
| B05C 1/00 | (2006.01) |
| B05C 13/02 | (2006.01) |
| B05C 5/00 | (2006.01) |

(52) U.S. Cl. ......... 118/712; 118/307; 118/208; 118/708
(58) Field of Classification Search .................. 118/694, 118/307, 208, 712, 713, 708; 401/208, 219; 184/17; 427/117, 118, 119, 8, 9, 299, 401
See application file for complete search history.

(56) References Cited

U.S. PATENT DOCUMENTS

| 2,786,927 | A | | 3/1957 | Veldhuis | |
| 4,638,761 | A | * | 1/1987 | Carrick | 118/694 |
| 4,664,058 | A | * | 5/1987 | Schroeder et al. | 118/249 |
| 2004/0144304 | A1 | * | 7/2004 | Ooshima et al. | 118/208 |

FOREIGN PATENT DOCUMENTS

| DE | 370776 C | 3/1923 |
| JP | 05033311 A | 2/1993 |
| JP | 2005200867 A | 7/2005 |

OTHER PUBLICATIONS

Jun Luo, Shaorong Xie, Zhenbang Gong, Cable Maintenance Robot and its Dynamic Response Moving on the Horizontal Cable, IEEE, 2005.*
Swedish Patent Office, Intl Search Report in PCT/SE2007/050208, May 21, 2007.
Swedish Patent Office, Intl Preliminary Report on Patentability in PCT/SE2007/050208, Oct. 8, 2008.

* cited by examiner

*Primary Examiner* — Yewebdar Tadesse
(74) *Attorney, Agent, or Firm* — Potomac Patent Group PLLC

(57) ABSTRACT

The present invention relates to a device arranged to move along a cable (1), preferably a tension cable of a suspension bridge, in order to obstruct covering of snow or ice on the cable. The device (2) comprises a compound (6) that obstructs covering of snow or ice as well as means (10) to coat the cable (1) with the compound (6). In addition, the device comprises sensors arranged to detect how large amount of the compound that is in the container. The sensors detect if the container needs to be replenished, and if so is the case, the device is arranged to automatically move to a replenishing device in order to there replenish more of the compound. The present invention also relates to a method to obstruct covering of snow or ice on a cable (1), preferably a tension cable of a suspension bridge.

7 Claims, 4 Drawing Sheets

DEVICE AND METHOD FOR CLEANING CABLES

TECHNICAL FIELD

The present invention relates to a device and a method to obstruct covering of snow or ice on cables, preferably tension cables of suspension bridges.

A problem regarding suspension bridges that are built in a cold climate is that snow and ice accumulated on the tension cables fall down on cars and other traffic passing across the bridge underneath the tension cables. The problem arises when a thicker and thicker layer of hard snow and ice has been formed on the tension cables during a long period of time. If there after that will be a change in the weather with air temperatures above 0° C., the cable may be warmed up to such an extent that the layer of snow and ice closest to the cable begins to melt, the entire accumulated snow and ice layer running the risk of sliding off the cable and down on the traffic below. Hard winds may also bring about that accumulated snow and ice layers come loose from the cables and cause damage.

PRIOR ART

Existing solutions consist of different kinds of heating of the wires in order to prevent ice covers or freezing-on, or devices that periodically stretch or vibrate the wires. There are warning devices that sense the thickness of the layer of ice/snow that covers the cables, and if the thickness becomes too great, the bridge is closed for traffic.

There are also solutions in the form of devices intended to move up and down along the cables of a bridge and scrape away possible snow and ice accumulated on the cables, see for example JP5033311—"CABLE SNOW REMOVER".

However, said known constructions are either very expensive or unnecessarily complicated in order to be particularly attractive solutions of the problem with down-falling ice and snow from cables.

However, DE 370 776 C discloses a device that is a simple solution of the problem with snow and ice on cables. The device can move along a cable and simultaneously scrape away ice or other covering as well as also coat the cable with oil or grease. The oil or the grease is found in a container connected to the device. A disadvantage of this device is that it permanently has to be under the supervision of an operator, both for the operation of the device as well as for replenishment of oil or grease. Otherwise, there is a risk that the function of the device becomes considerably deteriorated.

SUMMARY OF THE INVENTION

Thus, the object of the present invention is to provide a device and a method that solve the above mentioned problems and prevent or at least obstruct covering of snow and ice on cables and that require minimal superintendence by an operator. Said object is attained by means of a device that comprises a compound in a container that obstructs covering of snow or ice as well as comprises means for coating the cable with the compound. In addition, the device comprises sensors arranged to detect how large amount of the compound that is in the container. The sensors detect if the container needs to be replenished, and if so is the case, the device is arranged to automatically move to a replenishing device in order to there replenish more of the compound.

The invention also relates to a method to obstruct covering of snow or ice on a cable, preferably a tension cable of a suspension bridge. A device is arranged to be moved along the cable and simultaneously apply a compound to the cable that obstructs covering of snow and ice on the same. Upon movement of the device along the cable, it is detected whether the device needs to be replenished or not. If the compound is about to be used up in the device, the device is automatically moved to a replenishing device, and there, more of the compound is transferred from the replenishing device to the device.

With the present invention, a simple and relatively inexpensive device is obtained that does not need any inspection by an operator to ensure a necessarily large amount of the compound that obstructs covering of snow or ice. Thereby, it is not risked that the device is run empty along the cable, which would cause increased covering of, e.g., ice and snow on the cable.

Additional embodiments of the invention are defined in the appurtenant dependent claims.

BRIEF DESCRIPTION OF THE DRAWINGS

In the following, the invention will be described in a non-limiting way and for illustrative purposes, reference being made to accompanying figures, wherein.

DETAILED DESCRIPTION OF THE INVENTION

Figure 1:
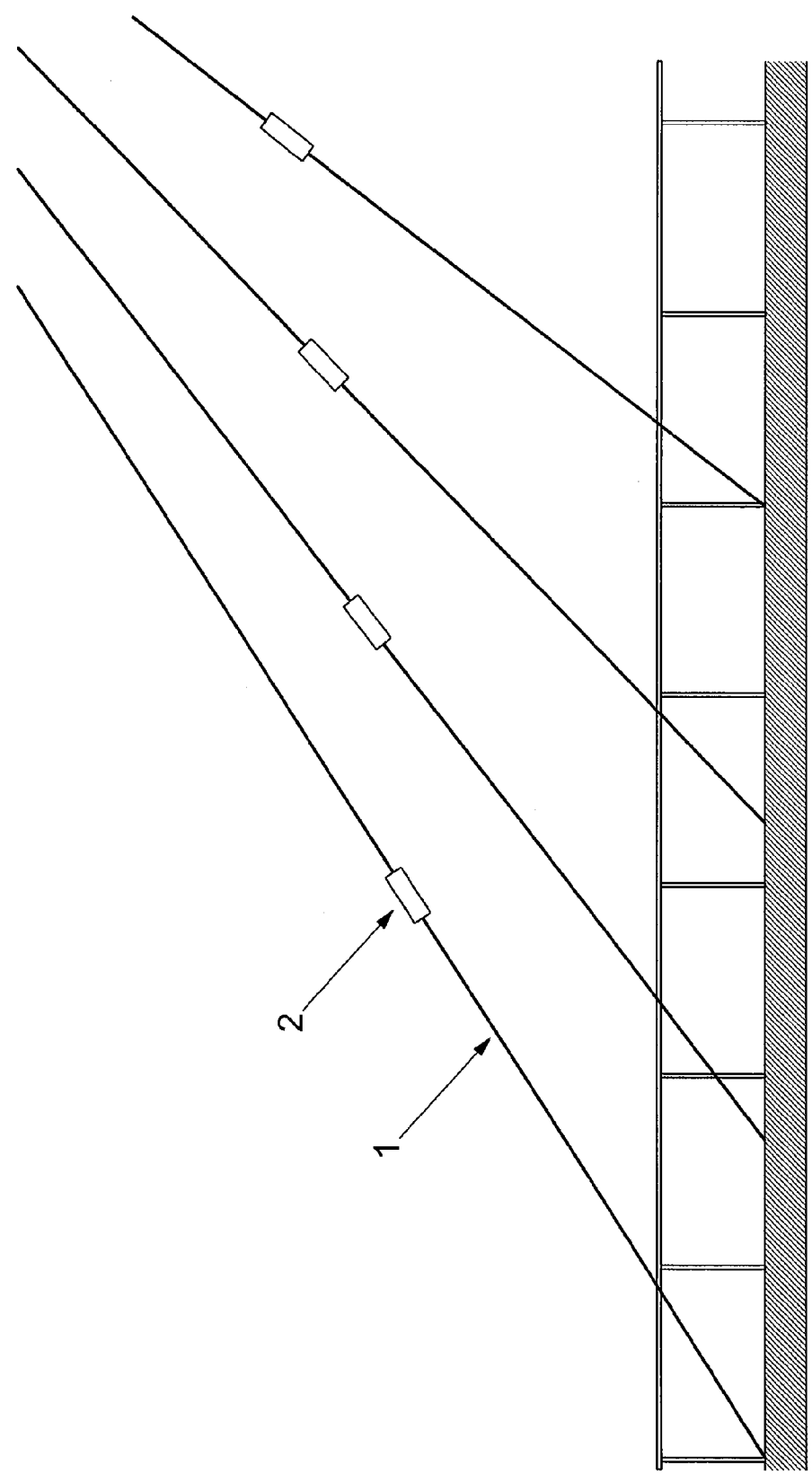
FIG. 1 shows a schematic side view of a bridge having tension cables as well as a device according to the invention.

FIG. 1 shows a schematic side view of a bridge having tension cables 1 as well as a device 2 according to the invention. In the figure, only one tension cable 1 is provided with a device 2 according to the invention. The device is intended to move substantially along the entire length of the tension cable 1. The cables 1 need not necessarily be tension cables of a suspension bridge, but may, for instance, be cables in connection with other types of large buildings such as a stadium.

Figure 2:
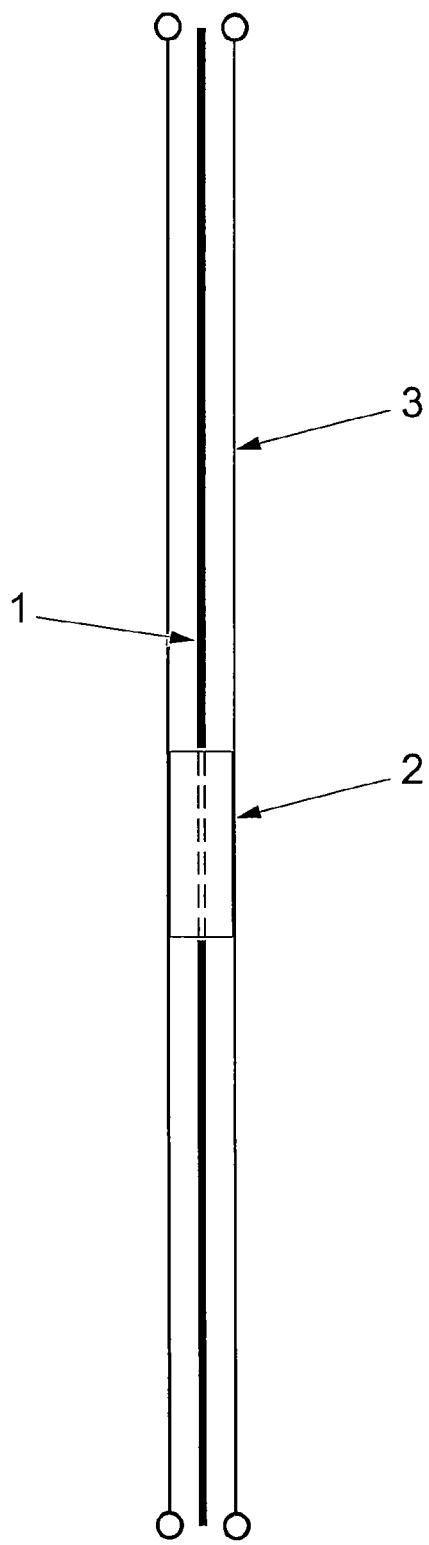
FIG. 2 shows a schematic view of a tension cable having a device according to the invention as well as a pulling wire.

FIG. 2 shows a preferred embodiment according to the invention, in which the device is connected to one or more pulling wires 3 that cause the device to be moved along the tension cable 1 and simultaneously coat the cable with a layer of a compound that prevents the cable from being covered with snow or ice. The pulling wire 3 is coupled to a motor (not shown in FIG. 2; see FIG. 4) that pulls the wires up and down along the tension cable 1. Preferably, the wire 3 runs on pull-wheels (not shown) situated in each end of the tension cable 1 or in each end of the zone of the tension cable 1 that the device should be moved along. Preferably, the wire 3 is in the form of a closed wire loop and the motor, which advantageously is an electric motor, drives around the wire by rotating one or both of the pull-wheels. The motor may also be connected to some form of software that can control the motor. The software may be connected to sensors 12 (not shown in FIG. 2; see FIG. 4) that sense the temperature and weather conditions, the motor being arranged to be in operation or stand still depending on the external conditions, such as weather, wind, temperature and moisture. If it, for instance, is snowing and blowing, the motor is in operation generally continuously in order to guarantee that the cable all the time is provided with a layer of a compound that prevents application of snow and ice on the cable. However, if there are degrees above freezing and calm, there is no reason to let the device run along the cable, but the motor may rest. Even if the device 2 in this embodiment is arranged to entirely surround the cable at a part of the cable, it is conceivable to have designs where the device only partly covers the cable.

Figure 3:
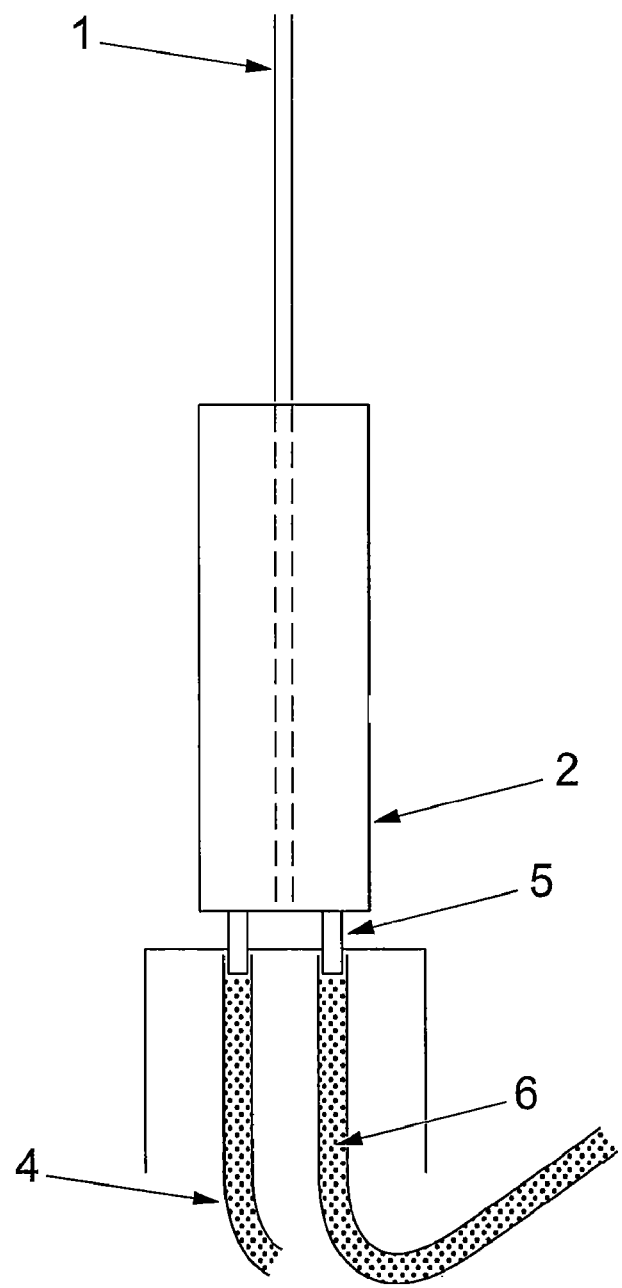
FIG. 3 shows a schematic view of an example of how a device according to the invention is replenished with an anti-freezing compound, FIG. 4 finally shows a detailed view of an example of an internal design of a device according to the invention.

FIG. 3 shows an example of how a device 2 according to the invention is replenished with an anti-freezing compound 6. One or more pipes 4 are connected to a tank containing a compound having low freezing point, which, for instance, may be glycol, ethanol, silicone oil, or some salt and/or sugar solution. When the device 2 according to the invention is to be replenished with the compound 6 in question, one or more projecting parts 5, which are adapted to the internal shape of the pipes 4, are coupled into the pipes, and then the device automatically is filled with a desired amount of the compound 6. The compound is preferably liquid having a viscous consistency, but may however also be, for instance, a gel. Advantageously, sensors 13 (not shown in FIG. 3; see FIG. 4) that sense the amount of the compound that is in the device, and whether it needs to be replenished or not, are arranged in a tank or the like of the device, and therefore the device only needs to dock to the pipes 4 if required.

The sensors 13 may, e.g., be arranged to detect if the amount of compound in the device 2 (the container 9) is below a given limit value.

In such a way, the device can automatically move to the filling place for replenishment when the compound 6 is about to be used up in the device 2. The filling place is preferably arranged at the upper end of a cable, on the upper part of the bridge pylon, to which the de-icing agent 6 for instance is pumped up by a suitable station pump in order to, in this way, decrease the load on the device. By arranging the filling place at the top of the pylon, where the distance between the cables is smaller, it becomes simpler to provide a common filling place for different devices 2 even if they are acting on different cables. However, the filling places may naturally also be arranged on the lower end of a cable, which facilitates manual replenishment of the tanks of the filling places. In principle, the filling places may be placed anywhere along the cable. If the filling place is arranged on the upper end, the device may, for instance, be replenished with an amount of the de-icing agent 6 that precisely is enough in order to coat the cable 1 with one layer of the agent 6 during the travel of the device down the cable 1. Upon the return travel, upward the cable 1, back to the upper part of the cable 1, the device is emptied of the agent 6, the work required to pull up the device 2 becoming the smallest possible.

Figure 4:
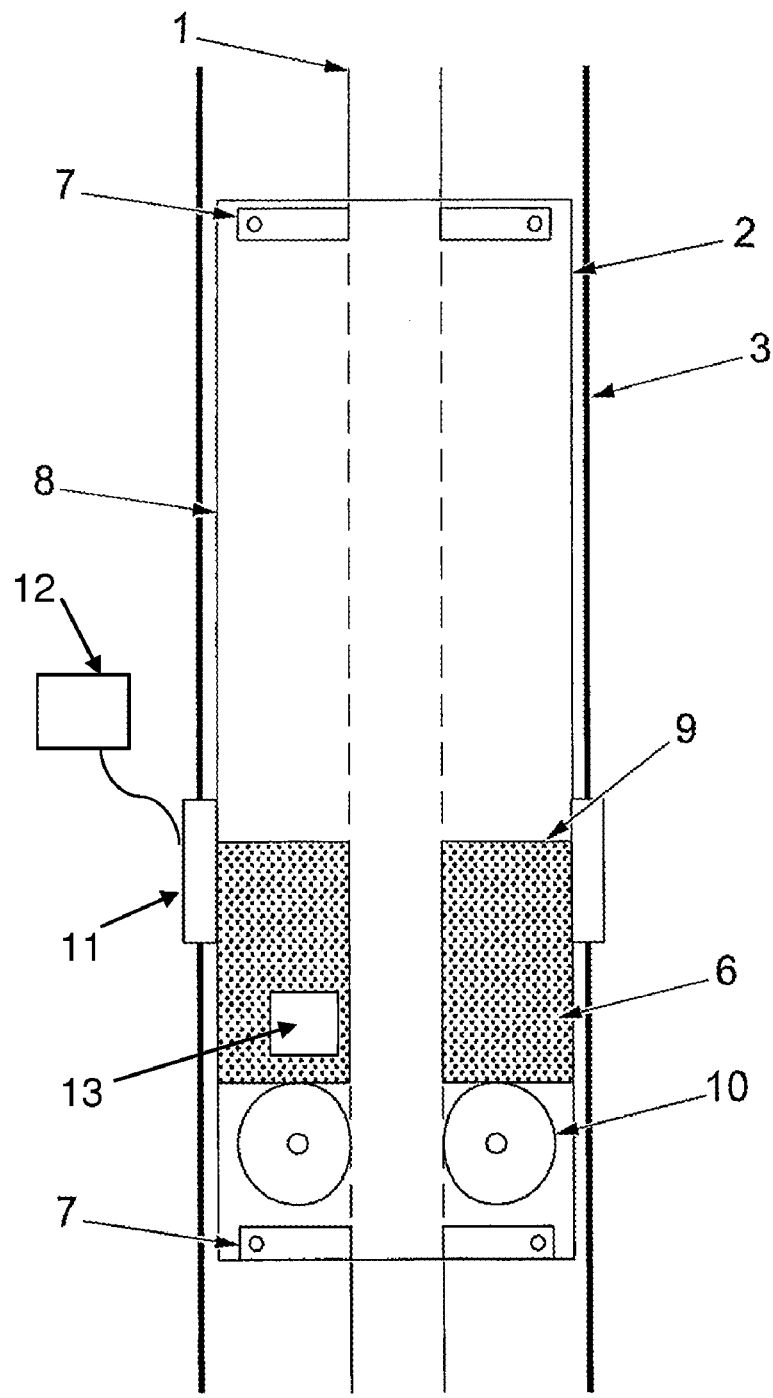

FIG. 4 shows a schematic example of how a device according to the invention could be constructed interiorly. Scrapers 7 having resilient properties are arranged to scrape away possible snow and ice that have been formed on the cable 1. These are preferably arranged at the very front and/or back of the device so that scraped-off snow or ice, without obstacle, can be removed directly from the cable depending on in which direction the device 2 moves along the cable 1. The amounts of ice and snow that will be loosened from the cable by the scrapers are, provided that the same are operated at reasonably short intervals, so small that they will not be able to cause any damage on the traffic below, which thereby neither needs to be stopped during the scraping-off. Since the scrapers are resilient, the device has certain flexibility and will not stop because of small non-removable irregularities on the cable, but becomes reasonably reliable in operation. According to an alternative embodiment, the scrapers are in the form of rotating brushes of a suitable material. A preferably cylindrical casing 8 surrounds the entire device 2, one or more pulling wires 3 being connected to the casing 8 and pulled by a motor 11. Inside the casing, there is a tank 9 or a similar storage space for the compound that should coat the cable 1. When the device is arranged to be replenished automatically, in the way described above, reference being made to FIG. 3, the tank 9 is advantageously fairly small so that the weight of the device is minimized and includes sensors 13. However, if the replenishment would take place manually, it would be necessary with a large tank 9 in order to avoid continual replenishment. If the compound that should coat the cable is not replenished automatically but manually, this means that the tank 9 or the storage space including the compound has to be made considerably larger to avoid unnecessarily much maintenance in the form of replenishment of the coating compound.

In order to achieve an even distribution of the compound 6 along the cable 1, the device 2 comprises internal rolls 10, which are in direct contact with the cable 1 and rotate as the device moves along the cable. The rolls 10 are preferably manufactured from a soft and flexible material in order to provide an even distribution along the length and circumference of the entire cable. Simultaneously, the material should be resistant to rough weather and influence from the cable. The means 10 to apply the compound to the cable 1 do not have to be rolls and may also be in the form of a sponge-like device, brushes, spray nozzles, etc. If the compound 6 is not a liquid but a gel or a compound having a solid consistency that yet can be coated on the cable 1, it would be enough that the compound substantially all the time is in contact with the surface to be coated, and may for instance be pressed against the cable by means of a resilient device. The compound could also be a powder or a salt of grain shape. Suitably, said compound is environmental-friendly.

The nature and the function of the invention should have been clear from what has been mentioned above and shown in the drawings, and the invention is naturally not limited to the embodiment described above and shown in the accompanying drawings. Modifications are feasible, the pulling wire could, for instance, be supplemented with or replaced by wheels or belts situated in the device and driven by an internal motor, without departing from the protection area of the invention, such as it is defined in the claims. The driving may, for example, be effected by wind- or solar-cell-operated electric motors, and different motion patterns may also be a possibility, for example, that it is rotated around the cable.

The invention claimed is:

1. A device arranged to move along a cable in order to obstruct covering of snow or ice on the cable, the device comprising:
   a compound in a container that obstructs covering of snow or ice;
   means for coating the cable with the compound;
   first sensors arranged to detect how large an amount of the compound is in the container;
   wherein if the container needs to be replenished as indicated by the first sensors, the device is arranged to move automatically to a replenishing device arranged at a filling place on the cable for replenishment;
   means for connecting the device to the replenishment device;
   second sensors arranged to sense environmental conditions at the cable; and
   a motor responsive to the second sensors and configured to drive the device.

2. The device of claim 1, wherein the device is arranged to entirely surround the cable.

3. The device of claim 1, further comprising resilient scrapers arranged to scrape away snow or ice present on the cable.

4. The device of claim 1, wherein the compound is a liquid, and the container is arranged to store the liquid.

5. The device of claim 1, wherein the coating means includes rollers arranged to distribute the compound along the cable.

6. The device of claim 1, wherein the compound is a gel or a solid.

7. The device of claim 1, wherein the device is arranged to be moved along the cable by at least one pulling wire.

* * * * *